(12) United States Patent
Fujishima et al.

(10) Patent No.: US 10,885,806 B2
(45) Date of Patent: Jan. 5, 2021

(54) MUSICAL SCORE PROCESSING METHOD AND MUSICAL SCORE PROCESSING SYSTEM

(71) Applicant: Yamaha Corporation, Shizuoka (JP)

(72) Inventors: Takuya Fujishima, Shizuoka (JP); Katsumi Ishikawa, Shizuoka (JP); Shinya Sakurada, Shizuoka (JP); Toshiyuki Hata, Shizuoka (JP); Norihiro Uemura, Shizuoka (JP); Takashi Otsuka, Nisshin (JP); Motoji Nagata, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 0 days.

(21) Appl. No.: 16/460,377

(22) Filed: Jul. 2, 2019

(65) Prior Publication Data
US 2019/0333406 A1    Oct. 31, 2019

Related U.S. Application Data

(63) Continuation of application No. PCT/JP2017/046920, filed on Dec. 27, 2017.

(30) Foreign Application Priority Data

Jan. 6, 2017    (JP) .................................. 2017-001392

(51) Int. Cl.
*G09B 15/02* (2006.01)
*G10G 1/00* (2006.01)
*G10H 1/00* (2006.01)

(52) U.S. Cl.
CPC ............. *G09B 15/023* (2013.01); *G10G 1/00* (2013.01); *G10H 1/0008* (2013.01); *G10H 2220/015* (2013.01)

(58) Field of Classification Search
CPC .................................................... G09B 15/023
See application file for complete search history.

(56) References Cited

U.S. PATENT DOCUMENTS

| | | | | |
|---|---|---|---|---|
| 6,175,070 | B1 * | 1/2001 | Naples ................. | G09B 15/003 84/470 R |
| 7,129,407 | B2 * | 10/2006 | Hiratsuka ............ | G10H 1/0008 84/609 |

(Continued)

FOREIGN PATENT DOCUMENTS

| JP | 2001-265326 A | 9/2001 |
|---|---|---|
| JP | 2003-114672 A | 4/2003 |
| JP | 2008-171441 A | 7/2008 |

OTHER PUBLICATIONS

International Search Report in PCT/JP2017/046920 dated Mar. 20, 2018.

(Continued)

*Primary Examiner* — Robert W Horn
(74) *Attorney, Agent, or Firm* — Global IP Counselors, LLP

(57) ABSTRACT

A musical score processing method that is realized by a computer includes receiving a control data related to displaying of a musical piece from a music processor that executes a process related to the musical piece and that is realized by a music processing program, using inter-application communication, based on a musical score processing program, and executing a display control process by displaying a musical score of the musical piece on a display device and controlling the displaying in accordance with the control data that has been received, based on the musical score processing program. The music processing program is separate from the musical score processing program.

6 Claims, 8 Drawing Sheets

(56) References Cited

U.S. PATENT DOCUMENTS

| | | | | |
|---|---|---|---|---|
| 7,612,278 | B2* | 11/2009 | Sitrick | G09B 15/002 |
| | | | | 84/609 |
| 7,893,337 | B2* | 2/2011 | Lenz | G09B 15/02 |
| | | | | 84/477 R |
| 8,273,976 | B1* | 9/2012 | Dalby | G10H 1/0066 |
| | | | | 84/602 |
| 8,338,684 | B2* | 12/2012 | Pillhofer | G09B 15/00 |
| | | | | 84/470 R |
| 9,024,169 | B2* | 5/2015 | Sumi | G06F 16/683 |
| | | | | 84/616 |
| 9,040,801 | B2* | 5/2015 | Hiratsuka | G10G 1/02 |
| | | | | 84/609 |
| 9,147,352 | B1* | 9/2015 | Cotrone | G09B 15/023 |
| 9,424,822 | B2* | 8/2016 | Bisnauth | G09B 15/023 |
| 10,204,617 | B2* | 2/2019 | Ishikawa | G10L 13/10 |
| 2001/0023635 | A1 | 9/2001 | Taruguchi et al. | |
| 2002/0004191 | A1* | 1/2002 | Tice | G09B 15/00 |
| | | | | 434/350 |
| 2003/0167903 | A1* | 9/2003 | Funaki | G09B 15/003 |
| | | | | 84/477 R |
| 2006/0150803 | A1* | 7/2006 | Taub | G10H 1/0008 |
| | | | | 84/616 |
| 2008/0196575 | A1* | 8/2008 | Good | G09B 15/04 |
| | | | | 84/470 R |
| 2008/0302233 | A1* | 12/2008 | Ding | G09B 15/023 |
| | | | | 84/609 |
| 2014/0233918 | A1* | 8/2014 | Roberts, Jr. | G11B 27/105 |
| | | | | 386/285 |
| 2017/0351973 | A1* | 12/2017 | Elgammal | G06N 5/022 |
| 2019/0333406 | A1* | 10/2019 | Fujishima | G09B 15/00 |

OTHER PUBLICATIONS

Connect with Others Using Rewire in the New Finale, [online], Oct. 13, 2016, [retrieved on Jul. 2, 2019], internet, https://www.finalemusic.com/blog/connect-others-using-rewire-new-finale.

Gakufuni kakikomino dekiru apuri, [online], Sep. 22, 2013, [retrieved on Jul. 2, 2019], internet, https://blog.goo.ne.jp/concert_lumiere/e/31684d8c359f704003e896d34193fc89.

Translation of Office Action in the corresponding Japanese Patent Application No. 2017-001392, dated Nov. 12, 2020.

* cited by examiner

MUSICAL SCORE PROCESSING METHOD AND MUSICAL SCORE PROCESSING SYSTEM

CROSS-REFERENCE TO RELATED APPLICATIONS

This application is a continuation application of International Application No. PCT/JP2017/046920, filed on Dec. 27, 2017, which claims priority to Japanese Patent Application No. 2017-001392 filed in Japan on Jan. 6, 2017. The entire disclosures of International Application No. PCT/JP2017/046920 and Japanese Patent Application No. 2017-001392 are hereby incorporated herein by reference.

BACKGROUND

Technological Field

The present invention relates to technology for displaying a musical score of a musical piece.

Background Information

Various techniques for displaying a musical score of a musical piece on a display device have been proposed in the prior art. For example, Japanese Laid-Open Patent Application No. 2001-265326 discloses a configuration in which a current performance position of a user is estimated in parallel with a process for displaying a musical score of a musical piece, and the performance position on the musical score displayed on the display device is highlighted.

As in the estimation of the performance position disclosed in Patent Document, various types of processing related to the musical piece (hereinafter referred to as "music processing") are executed in parallel with the display of the musical score. However, in a situation in which the musical score display and the music processing are realized by a single program, it is necessary to prepare a separate musical score for each of a plurality of programs that correspond to the various types of music processing; thus, there is the problem of a large burden placed on the user.

SUMMARY

Given the circumstances described above, an object of a preferred aspect of this disclosure is to make functions related to music easy to use.

In order to solve the problem described above, a music data processing method according to a preferred aspect of this disclosure comprises receiving a control data related to displaying of a musical piece from a music processor that executes a process related to the musical piece and that is realized by a music processing program, using inter-application communication, based on a musical score processing program, and executing a display control process by displaying a musical score of the musical piece on a display device and controlling the displaying in accordance with the control data that has been received, based on the musical score processing program. The music processing program is separate from the musical score processing program.

A musical score processing system according to another aspect of this disclosure comprises an electronic controller including at least one processor. The electronic controller is configured to execute a plurality of modules including a reception processing and a display control module. The reception processing module is realized by a musical score processing program, and receives a control data related to displaying of a musical piece from a music processor that executes a process related to the musical piece and that is realized by a music processing program that is separate from the musical score processing program, using inter-application communication. The display control module is realized by a musical score processing program and displays a musical score of the musical piece on a display device and controls the displaying in accordance with the control data received by the reception processing module.

DETAILED DESCRIPTION OF THE EMBODIMENTS

Selected embodiments will now be explained with reference to the drawings. It will be apparent to those skilled in the field of musical performances from this disclosure that the following descriptions of the embodiments are provided for illustration only and not for the purpose of limiting the invention as defined by the appended claims and their equivalents.

First Embodiment

Figure 1:
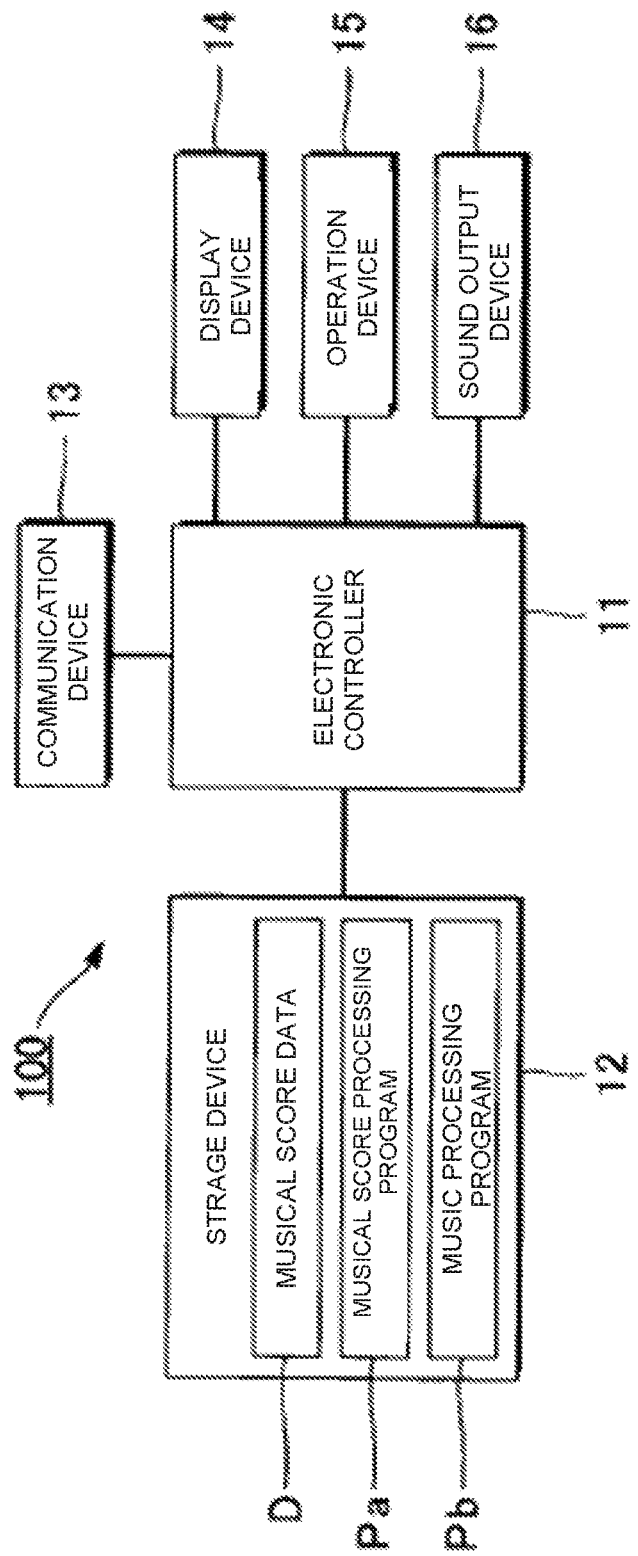
FIG. 1 is a block diagram of an information processing system according to a first embodiment.

FIG. 1 is a block diagram of an information processing system 100 according to a first embodiment. The information processing system 100 according to the first embodiment is a computer system that displays a musical score and executes prescribed information processing (music processing) with respect to a specific musical piece (hereinafter referred to as "musical piece to be processed"). As shown in FIG. 1, the information processing system 100 comprises an electronic controller 11, a storage device 12, a communication device 13, a display device 14, an operation device 15, and a sound output device 16. The term "electronic controller" as used herein refers to hardware that executes software programs, and does not include a human. For example, a portable terminal device, such as a mobile phone or a smartphone, or an information processing device, such as a personal computer, can be used as the information processing system 100. The information processing system 100 can be realized as a single device, or as a group of a plurality of devices which are separately configured.

The electronic controller 11 is a computer that comprehensively controls each element constituting the information processing system 100 and is configured to include a processing circuit, such as a CPU (Central Processing Unit).

The electronic controller 11 can be configured to comprise, instead of the CPU or in addition to the CPU, programmable logic devices such as a DSP (Digital Signal Processor), an FPGA (Field Programmable Gate Array), and the like. In addition, the electronic controller 11 can include a plurality of CPUs (or a plurality of programmable logic devices). The communication device 13 communicates with an external device. For example, a communication device that carries out mobile communication using a mobile communication network or short-range wireless communication such as WiFi® is used as the communication device 13. Communication by means of the communication device 13 can be either wired communication or wireless communication. Thus, a communication device is a hardware device capable of transmitting an analog or digital signal over a telephone network, other communication wire, or wirelessly.

The display device 14 (display such as a liquid-crystal display panel) displays an image instructed by the electronic controller 11. For example, a musical score of the musical piece to be processed is displayed on the display device 14. The operation device 15 is an input device that receives operations from a user. Specifically, a touch panel that detects contact of the user with a display surface of the display device 14 is suitable as the operation device 15. The sound output device 16 (for example, a speaker or headphones) reproduces sound as instructed by the electronic controller 11.

A program that is executed by the electronic controller 11 and various data that are used by the electronic controller 11 are stored in the storage device 12. A known data storage medium, such as a magnetic storage medium or a semiconductor storage medium, or a combination of a plurality of various types of storage media can be freely employed as the storage device 12. The storage device 12 can be any computer storage device or any computer readable medium with the sole exception of a transitory, propagating signal. For example, the storage device 12 can be a computer memory device which can be nonvolatile memory and volatile memory. Moreover, a storage device 12 that is separate from the information processing system 100 (for example, cloud storage) can be prepared, and the electronic controller 11 can read from or write to the storage device 12 via a communication network, such as a mobile communication network or the Internet. That is, the storage device 12 can be omitted from the information processing system 100. As shown in FIG. 1, the storage device 12 according to the first embodiment stores musical score data D, a musical score processing program Pa, and a music processing program Pb.

The musical score data D represent a musical score of the musical piece to be processed. For example, an image file that represents the musical score in a raster format or vector format image (for example, a bitmap file or a PDF file) is suitable as the musical score data D. A file in which elements of the musical score, such as music symbols, are noted as logical information (for example, a MusicXML formal file) can also be used as the musical score data D. For example, the musical score data D distributed from a distribution device (not shown), such as a web server, are received by the communication device 13 and then stored in the storage device 12. For the sake of convenience, only one piece of the musical score data D of the musical piece to be processed is illustrated in FIG. 1. In practice, a plurality of pieces of the musical score data D corresponding to different musical pieces are stored in the storage device 12, and the user selects the musical piece to be processed by operating the operation device 15.

Each of the musical score processing program Pa and the music processing program Pb is software (application program) that carries out processing related to the musical piece to be processed. Specifically, the musical score processing program Pa is software for displaying the musical score of the musical piece to be processed on the display device 14, and the music processing program Pb is software for a prescribed music processing that is executed in parallel with the displaying of the musical score of the musical piece to be processed. Examples of the music processing include a beat point notification process (metronome) for notifying the user of beat points by means of periodic sound generation, and a performance evaluation process for evaluating the skillfulness of a performance (including singing) of the musical piece to be processed by the user.

The musical score processing program Pa and the music processing program Pb are separate programs. Specifically, the musical score processing program Pa and the music processing program Pb are not provided as part of a single piece of software that includes both, but are provided separately as mutually independent pieces of software, for example, at different times and stored in the storage device 12 (i.e., a non-transitory computer readable storage medium). That is, it can be said that the musical score processing program Pa and the music processing program Pb can be executed independently (that is, one can be executed without requiring the other). The musical score processing program Pa and the music processing program Pb are each distributed from a distribution device (not shown), such as a web server, received by the communication device 13, and then stored in the storage device 12. In addition, the musical score processing program Pa or the music processing program Pb that is stored in a portable storage medium, such as an optical disc, or a semiconductor storage medium can be transferred to the storage device 12.

Figure 2:
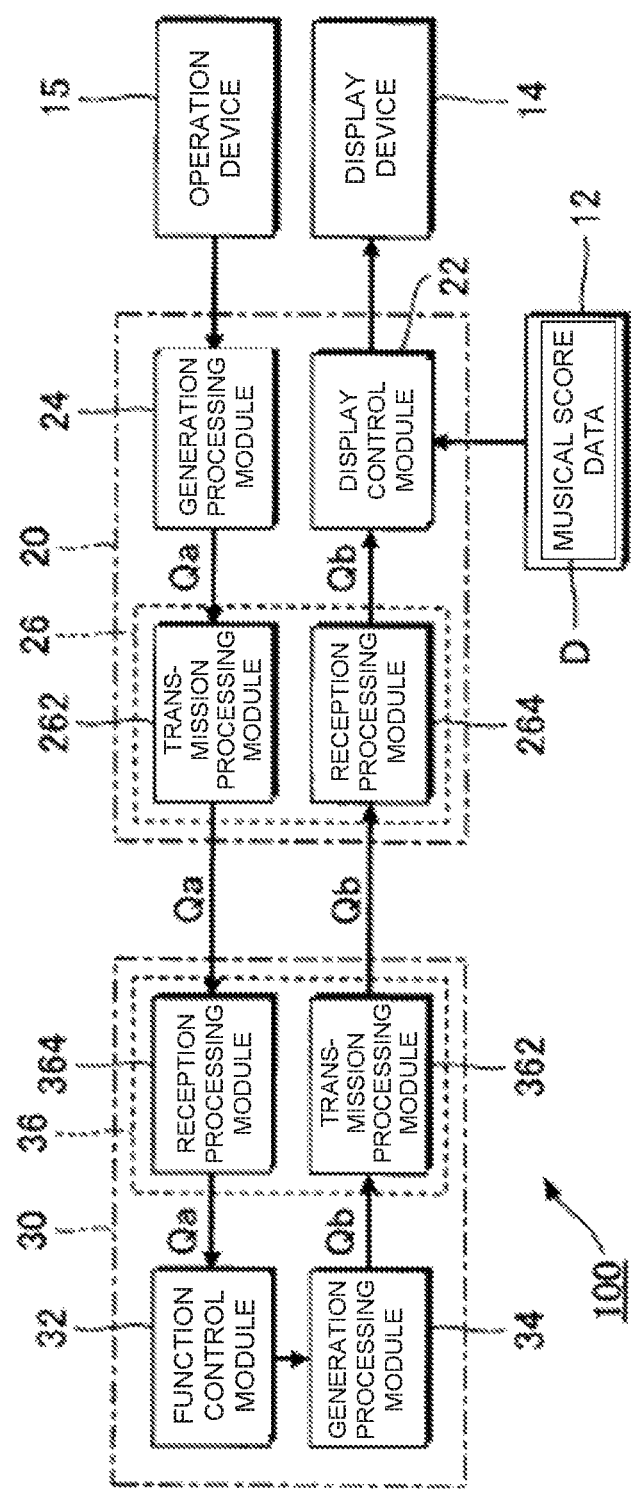
FIG. 2 is a block diagram focusing on functions of the information processing system.

FIG. 2 is a block diagram focusing on functions of the information processing system 100. As shown in FIG. 2, a musical score processor 20 (an example of the musical score processing system) is realized by the electronic controller 11 executing the musical score processing program Pa, and a music processor 30 is realized by means of the electronic controller 11 executing the music processing program Pb. The musical score processor 20 and the music processor 30 are functional bodies that are realized by the electronic controller 11 executing programs. Specifically, the musical score processor 20 displays the musical score of the musical piece to be processed on the display device 14, and the music processor 30 executes a prescribed music processing in parallel with the displaying of the musical score. Some of the functions of the electronic controller 11 can also be realized by a dedicated electronic circuit. Both the musical score processor 20 and the music processor 30 are configured by the parallel execution of the musical score processing program Pa and the music processing program Pb by using the electronic controller 11.

The musical score processor 20 and the music processor 30 can communicate with each other. Specifically, the musical score processor 20 and the music processor 30 cooperate with each other by means of sending and receiving data via inter-application communication (inter-process communication) using, for example, shared memory. The communication between the musical score processor 20 and the music processor 30 is communication conforming to communication protocols, such as MIDI (Musical Instrument Digital Interface) and Open Sound Control (OSC), for example. Communication between the musical score processor 20 and the music processor 30 can also be carried out with a proprietary protocol prepared for specific music processing. As can be understood from the foregoing description, it can also be said that the function related to the displaying of the musical score (musical score processor 20) and the function for music processing (music processor 30) are separated via the inter-application communication.

Figure 3:
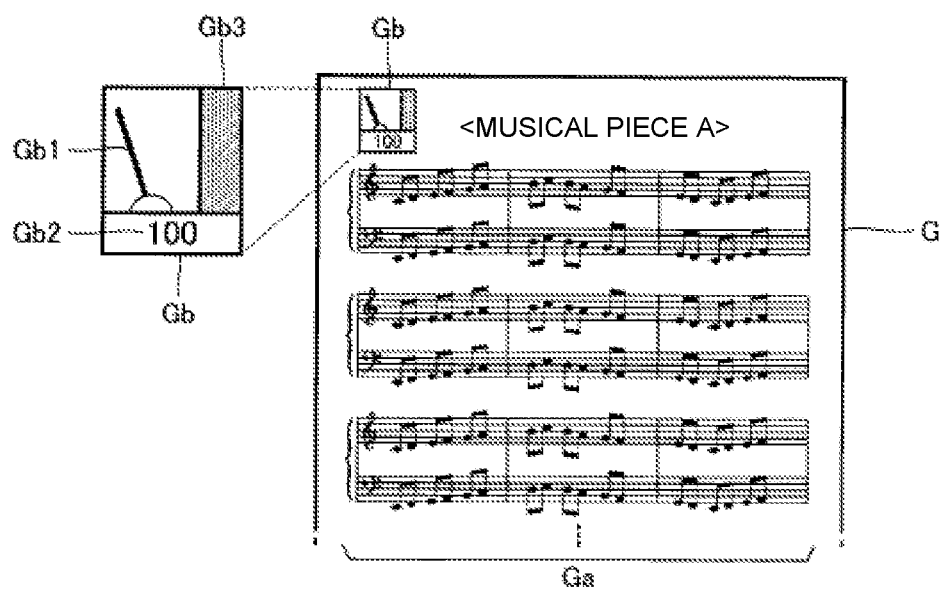
FIG. 3 is a schematic view of an image that is displayed on a display device.

As shown in FIG. 2, the musical score processor 20 is configured to execute a plurality of modules including a display control module 22, a generation processing module 24, and a communication control module 26. The display control module 22 displays various images on the display device 14. FIG. 3 is a schematic view of an image G that is displayed by the display control module 22 on the display device 14. As shown in FIG. 3, the image G displayed on the display device 14 includes a musical score image Ga and a function image Gb. The musical score image Ga is an image of the musical score of the musical piece to be processed represented by the musical score data D stored in the storage device 12. The function image Gb is an image related to the music processing that is executed by the music processor 30. The function image Gb of the first embodiment is a figure (that is, an icon) that is operated by the user in order to provide various instructions related to the music processing that is executed by the music processor 30. As shown in FIG. 3, the function image Gb is displayed superimposed on the musical score image Ga.

The user can appropriately operate the function image Gb using the operation device 15 in a state in which the musical score image Ga of the musical piece to be processed is displayed on the display device 14. The generation processing module 24 of FIG. 2 generates a control data Qa corresponding to the operation from the user on the function image Gb. The control data Qa is a message (for example, a callback message) for reporting the occurrence and content of an operation on the function image Gb to the music processor 30.

The communication control module 26 executes the communication (specifically, the above-mentioned inter-application communication) with the music processor 30. As shown in FIG. 2, the communication control module 26 of the first embodiment is configured to include a transmission processing module 262 and a reception processing module 264. The transmission processing module 262 transmits the control data Qa generated by the generation processing module 24 to the music processor 30. The reception processing module 264, on the other hand, receives a control data Qb, which corresponds to the result of the music processing by the music processor 30, from the music processor 30. The display control module 22 controls the displaying of images with the display device 14 according to the control data Qb that the reception processing module 264 receives from the music processor 30. Specifically, the image G displayed on the display device 14 (for example, the function image Gb) is changed according to the control data Qb.

As shown in FIG. 2, the music processor 30 execute a plurality of modules including a function control module 32, a generation processing module 34, and a communication control module 36. The communication control module 36 executes the communication (specifically, the above-mentioned inter-application communication) by means of the musical score processor 20. The communication control module 36 of the first embodiment is configured to include a transmission processing module 362 and a reception processing module 364. The transmission processing module 362 transmits the control data Qb to the musical score processor 20. The reception processing module 364 receives the control data Qa from the musical score processor 20.

The function control module 32 executes the music processing. The function control module 32 according to the first embodiment controls the music processing according to the control data Qa that the reception processing module 364 receives from the musical score processor 20. Specifically, the function control module 32 sets or changes the numerical value of a control variable (parameter) that is applied to the music processing according to the control data Qa. The generation processing module 34 generates the control data Qb corresponding to the result of the music processing by the function control module 32. The control data Qb can be, for example, a message to the musical score processor 20 to change the image G displayed on the display device 14 (for example, arranging or changing the function image Gb). The transmission processing module 362 transmits the control data Qb generated by the generation processing module 34 to the musical score processor 20.

Figure 4:
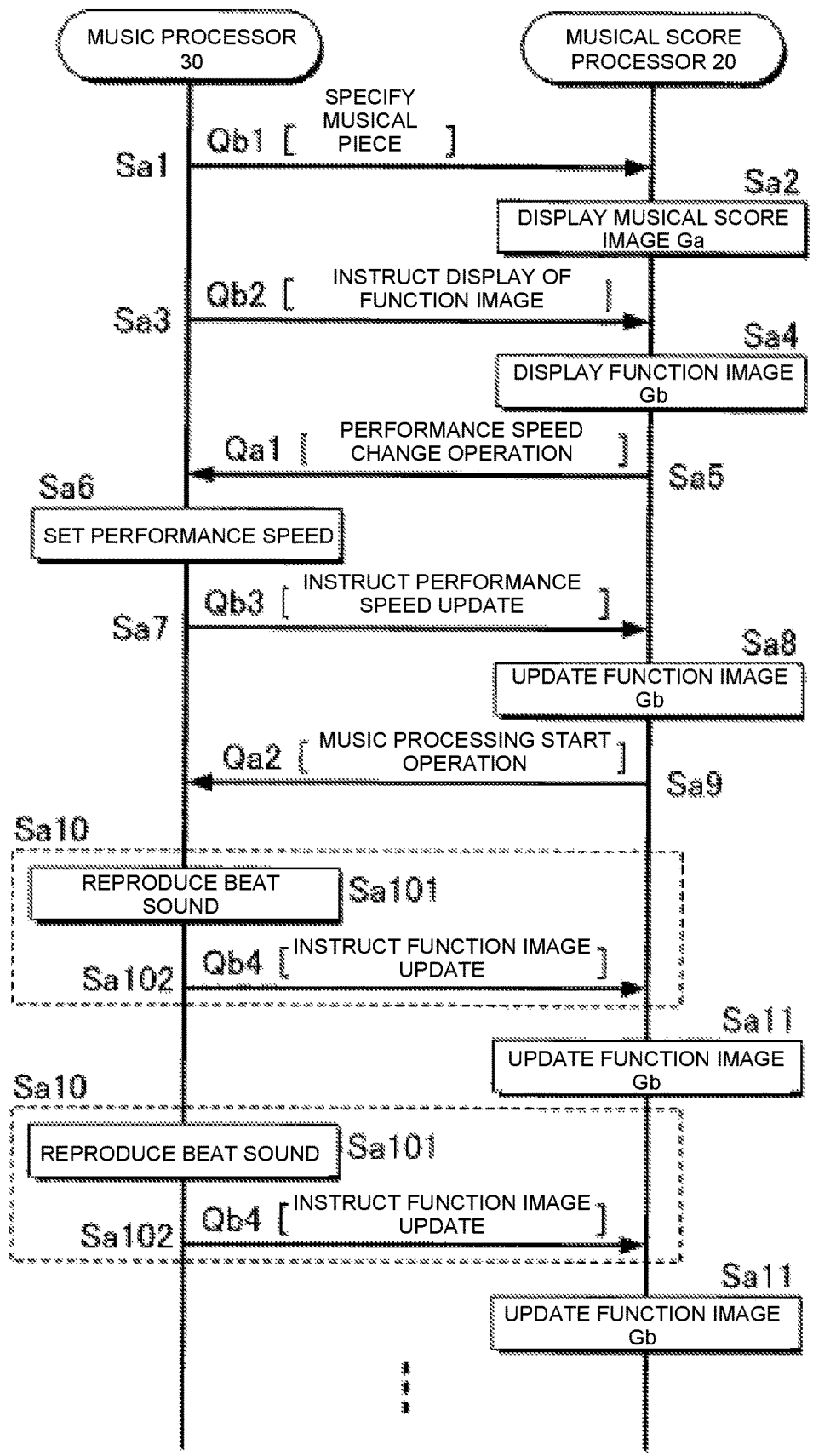
FIG. 4 is an explanatory view of operations of a musical score processor and a music processor.

The specific operation of the information processing system 100 according to the first embodiment will be described with reference to FIG. 4. In the description of FIG. 4, a beat point notification process (metronome), which periodically reproduces sound for notifying the user of each beat of the musical piece to be processed (hereinafter referred to as "beat sound"), is exemplified as music processing that is realized by the music processing program Pb. The process of FIG. 4 is started when the activation of the musical score processing program Pa and the music processing program Pb is instructed.

First, in the music processor 30, the generation processing module 34 generates control data Qb1 that includes designation of the musical piece to be processed, and the transmission processing module 362 transmits said control data Qb1 to the musical score processor 20 (Sa1). The display control module 22 of the musical score processor 20 displays the musical score image Ga of the musical piece to be processed on the display device 14 in accordance with the control data Qb1 that the reception processing module 264 receives from the music processor 30 (Sa2). Specifically, the display control module 22 acquires the musical score data D of the musical piece to be processed and designated in the control data Qb1 from the storage device 12 and displays the musical score image Ga indicated by the musical score data D on the display device 14.

In addition, in the music processor 30, the generation processing module 34 generates control data Qb2 for providing instruction for displaying the function image Gb, and the transmission processing module 362 transmits said control data Qb2 to the musical score processor 20 (Sa3). The display control module 22 of the musical score processor 20 displays the function image Gb on the display device 14 in accordance with the control data Qb2 that the reception processing module 264 receives from the music processor 30 (Sa4). Specifically, as shown in FIG. 3, the display control module 22 displays the function image Gb, which schematically represents the metronome, superimposed on the musical score image Ga.

As is shown in the enlargement in FIG. 3, the function image Gb of the first embodiment is configured to include an instruction image Gb1, a speed image Gb2 indicating a numerical value of the performance speed (tempo), and an operation image Gb3 that receives a designation of the performance speed. In a stage immediately after the display of the function image Gb is started, the performance speed indicated by the speed image Gb2 is set to a prescribed initial value. The user can designate a desired performance speed by means of operating the operation image Gb3 using the operation device 15. When the user operates the operation image Gb3, the generation processing module 24 generates control data Qa1, which represent the content of the operation on the operation image Gb3, and the transmission processing module 262 transmits said control data Qa1 to the music processor 30 (Sa5).

The music processor 30 sets the performance speed after the change (hereinafter referred to as "updated value") in accordance with the control data Qa1 that the reception processing module 364 receives from the musical score processor 20 (Sa6). The generation processing module 34 generates control data Qb3 that includes designation of the updated value set by the music processor 30, and the transmission processing module 362 transmits the control data Qb3 generated by the generation processing module 34 to the musical score processor 20 (Sa7). The control data Qb3 is instructions for updating the performance speed. The display control module 22 of the musical score processor 20 updates the function image Gb in accordance with the control data Qb3 that the reception processing module 264 receives from the music processor 30 (Sa8). Specifically, the display control module 22 changes the numerical value indicated by the speed image Gb2 in the function image Gb to the updated value designated in the control data Qb3.

When the desired performance speed is set by means of the procedure described above, the user can provide instruction for starting the music processing by means of appropriately operating the operation device 15. When the music processing is started, the generation processing module 24 of the musical score processor 20 generates control data Qa2 for providing instruction for starting the music processing, and the transmission processing module 262 transmits said control data Qa2 to the music processor 30 (Sa9).

When the reception processing module 364 receives the control data Qa2, the function control module 32 of the music processor 30 iteratively executes a unit process Sa10 (Sa101 and Sa102) each time a period corresponding to the performance speed (that is, the interval between consecutive beats) elapses. One unit process Sa10 includes a process in which the function control module 32 causes the sound output device 16 to output a prescribed beat sound (Sa101), and a process to transmit control data Qb4 for providing instruction for updating the function image Gb to the musical score processor 20 (Sa102). The control data Qb4 is generated by the generation processing module 34 and transmitted to the musical score processor 20 from the transmission processing module 362. The control data Qb4 means instructions for displacing the instruction image Gb1 of the function image Gb a prescribed amount.

The display control module 22 of the musical score processor 20 updates the function image Gb in accordance with the control data Qb4 that the reception processing module 264 receives from the music processor 30 (Sa11). Specifically, the display control module 22 displaces the instruction image Gb1 by a prescribed amount (specifically, an angle). By means of the sequential repetition of the unit process Sa10 executed by the music processor 30 and the updating of the function image Gb executed by the musical score processor 20 (Sa11), the instruction image Gb1 oscillates in synchronization with the beats that are generated in the period corresponding to the performance speed, and a beat sound is output from the sound output device 16 for each beat. That is, an operation of a mechanical metronome is simulated by the display (that is, an animation display) of the display device 14 and the sound output of the sound output device 16. The user refers to the musical score image Ga and performs the musical piece to be processed while ascertaining the beats of the musical piece to be processed by hearing the beat sound and visually checking the function image Gb.

As described above, in the first embodiment, the reception processing module 264 realized by the musical score processing program Pa receives the control data Qb by means of inter-application communication from the music processor 30 realized by the music processing program Pb, which differs from the musical score processing program Pa. The display control module 22 then controls the display in accordance with the control data Qb received by the reception processing module 264. By means of the configuration described above, compared to a configuration in which the musical score processor 20 and the music processor 30 are realized by a single program, the musical score data D and a common musical score processing program Pa can be used for the display of the musical score image Ga, with respect to a plurality of types of music processing that are realized by different music processing programs Pb. Accordingly, functions related to the musical piece to be processed or the musical score image Ga can be conveniently used.

Additionally, in the first embodiment, the transmission processing module 262, which is realized by the musical score processing program Pa, transmits the control data Qa corresponding to the user's operation to the music processor 30 by means of inter-application communication. Thus, a common musical score processing program Pa can be used for processing related to user operation, with respect to a plurality of types of music processing that are realized by different music processing programs Pb. Thus, there is the remarkable effect that functions related to the musical piece to be processed or the musical score image Ga can be conveniently used.

Providing one of either the musical score processing program Pa or the music processing program Pb as a plug-in of the other program, that is, the music processing program Pb or the musical score processing program Pa, is also assumed. However, depending on the platform (for example, the OS (Operating System)) employed by the information processing system 100, the provision of a plug-in can be restricted due to the specification. In the situation described above, as exemplified in the first embodiment, the configuration in which the musical score processing program Pa and the music processing program Pb cooperate with each other by means of the inter-application communication is suitable.

Second Embodiment

The second embodiment will now be described. In each of the embodiments illustrated below, elements that have the same actions or functions as in the first embodiment have been assigned the same reference symbols as those used to describe the first embodiment, and detailed descriptions thereof have been appropriately omitted.

Figure 5:
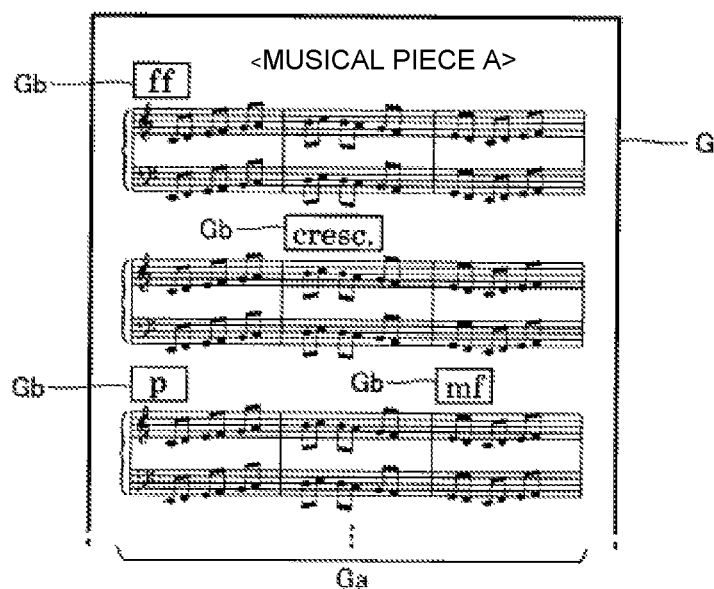
FIG. 5 is a schematic view of an image that is displayed on a display device according to a second embodiment.

FIG. 5 is a schematic view of the image G that the display control module 22 displays on the display device 14 according to a second embodiment. As shown in FIG. 5, the image G displayed on the display device 14 in the second embodiment includes the musical score image Ga and the function image Gb. The musical score image Ga is an image of the musical score of the musical piece to be processed represented by the musical score data D, as in the first embodiment. On the other hand, each function image Gb in the second embodiment is an image representing music information of the musical piece to be processed (for example, performance symbols). Specifically, various pieces of music information, such as dynamics (forte, piano, crescendo, etc.), tempo, and modification symbols, are expressed by the function image Gb.

In the second embodiment, a musical piece performance process for reproducing performance sounds by means of performing the musical piece to be processed is exemplified as the music processing that is realized by the music processing program Pb. Music data of the musical piece to be processed is used for the musical piece performance process. The music data are time-series data indicating the performance content of the musical piece to be processed (for example, time series of a plurality of notes) which are prestored in the storage device 12, for example. The operations by which the musical score processor 20 and the music processor 30 mutually send and receive the control data Qa or the control data Qb by means of inter-application communication are the same as in the first embodiment.

Figure 6:
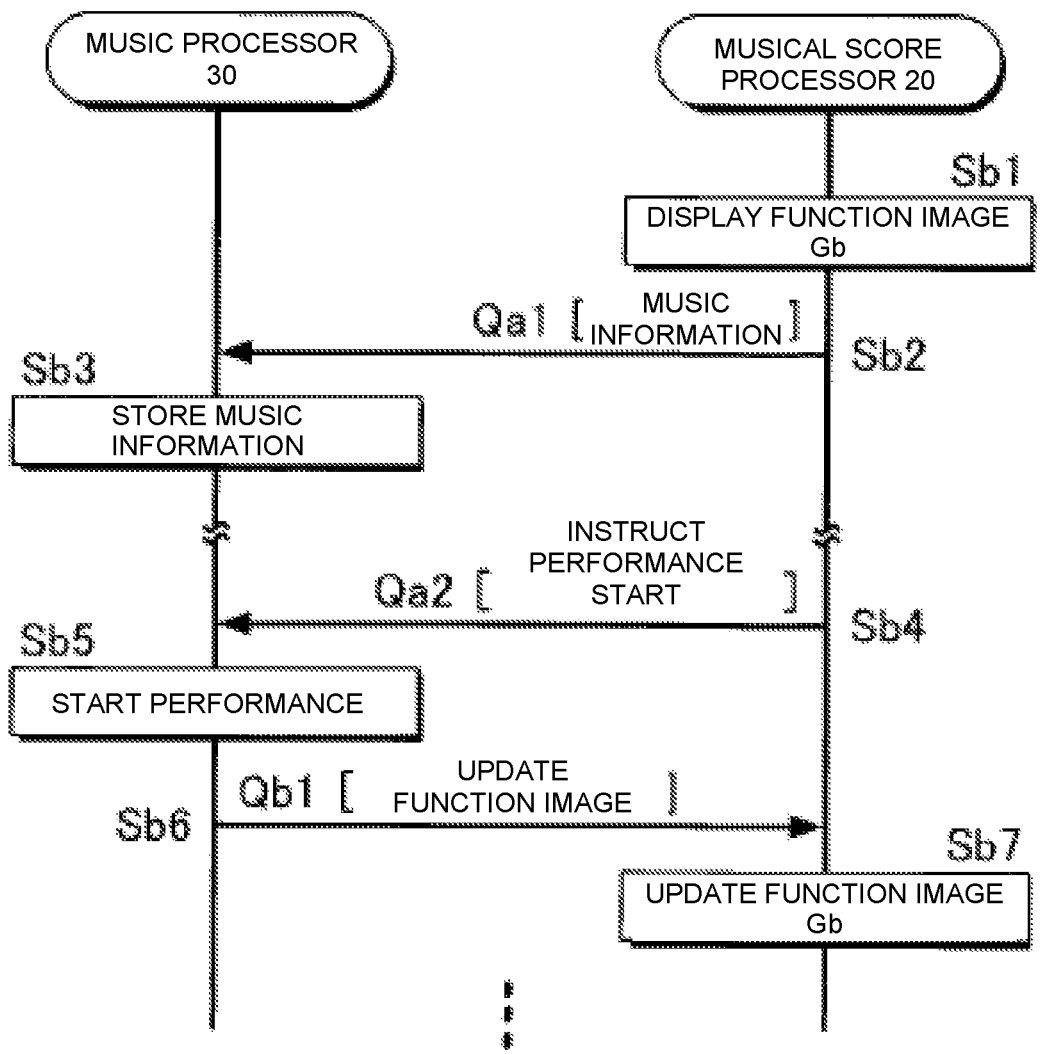
FIG. 6 is an explanatory view of operations of the musical score processor and the music processor according to the second embodiment.

FIG. 6 is an explanatory view of operations of the musical score processor 20 and the music processor 30 according to the second embodiment. When the musical score image Ga is displayed on the display device 14 by means of the same procedure as that of the first embodiment (Step Sa1 and Step S2), the user specifies the position and type of the music information by appropriately operating the operation device 15. The display control module 22 of the musical score processor 20 arranges the function image Gb of the music information specified by the user at the position specified by the user (Sb1). The generation processing module 24 generates the control data Qa1, which represents the music information specified by the user, and the transmission processing module 262 transmits the control data Qa1 to the music processor 30 (Sb2). When the reception processing module 364 receives the control data Qa1, the function control module 32 of the music processor 30 stores the music information specified in the control data Qa1 in the storage device 12 (Sb3). Specifically, the function control module 32 adds the music information specified in the control data Qa1 to the music data in the storage device 12. By means of the repetition of the process described above, a plurality of pieces of music information are added to the music data of the musical piece to be processed.

The user can provide instruction for starting the performance of the musical piece to be processed by operating the operation device 15. When the performance of the musical piece to be processed is started, the generation processing module 24 generates the control data Qa2 indicating the start of performance, and the transmission processing module 262 transmits the control data Qa2 to the music processor 30 (Sb4). When the reception processing module 364 receives the control data Qa2, the function control module 32 of the music processor 30 starts the performance of the musical piece to be processed with the music data stored in the storage device 12 (Sb5). Specifically, the function control module 32 generates audio signals representing performance sounds obtained by performing a plurality of notes specified by the music data with the characteristics specified by the music information (for example, dynamics or tempo), and supplies the audio signals to the sound output device 16 to thereby reproduce the performance sounds of the musical piece to be processed.

With the progression of the performance of the musical piece to be processed described above, the performance position in the musical piece to be processed moves toward the end of the musical piece to be processed over time. When the performance position approaches the time point of the musical piece to be processed at which the music information was added, the generation processing module 34 generates the control data Qb1 for providing instruction for changing the display mode with respect to the function image Gb corresponding to said musical score information, and the transmission processing module 362 transmits the control data Qb1 to the musical score processor 20 (Sb6). When the reception processing module 264 receives the control data Qb1, the display control module 22 of the musical score processor 20 changes the display mode of the function image Gb arranged in the vicinity of the current performance position in the musical score image Ga in accordance with the control data Qb1 (Sb7). For example, the function image Gb in the vicinity of the performance position is highlighted. As can be understood from the description above, each of a plurality of the function images Gb arranged in the musical score image Ga is highlighted in chronological order, in conjunction with the performance of the musical piece to be processed by the music processor 30. Thus, the user can hear the performance sounds of the musical piece to be processed reproduced by the sound output device 16 while visually checking the musical score image Ga and the function image Gb. The same effect as the first embodiment is realized in the second embodiment.

In the description above, the display mode is changed with respect to the function image Gb in the vicinity of the performance position, but the display mode can be changed with respect to the function image Gb that the user selects by operating the operation device 15. Moreover, the music processor 30 can estimate the position at which the user is currently playing (performance position) in the musical piece to be processed, for example, and change the display mode with respect to the function image Gb in the vicinity of the estimated performance position.

Third Embodiment

The storage device 12 of the information processing system 100 according to the third embodiment stores the same musical score processing program Pa as that of the first embodiment and the second embodiment, as well as a plurality of music processing programs Pb corresponding to different types of music processing. For example, the music processing program Pb of the first embodiment, which executes the beat point notification process, and the music processing program Pb of the second embodiment, which executes the musical piece performance process, are stored in the storage device 12.

The electronic controller 11 according to the third embodiment executes, from among the plurality of music processing programs Pb stored in the storage device 12, the music processing program Pb that the user selects by operating the operation device 15, together with the musical score processing program Pa. The cooperation between the musical score processing program Pa and the music processing program Pb (specifically, the inter-application communication between the musical score processor 20 and the music processor 30) is the same as in the first embodiment and the second embodiment. For example, the reception processing module 264 of the musical score processor 20 receives the control data Qb related to the display of the musical piece to be processed from each of a plurality of music processors 30 realized by different music processing programs Pb by means of inter-application communication. In the third embodiment, the plurality of music processing programs Pb cooperate with a common musical score processing program Pa, and one piece of musical score data D is shared with respect to the plurality of music processing programs Pb.

The same effects as those of the first embodiment are realized in the third embodiment. In addition, in the third embodiment, the reception processing module 264 of the musical score processor 20 receives the control data Qb from each of the plurality of music processors 30 realized by different music processing programs Pb by means of inter-application communication. Accordingly, there is the advantage that the musical score processing program Pa and the musical score data D can be shared with respect to the plurality of music processing programs Pb.

The developer of each music processing program Pb is not required to independently develop a musical score processing program Pa related to the display of the musical score image Ga, or to independently procure the musical score data D. Moreover, as long as the creator of the musical score data D has permitted the use of the musical score processing program Pa, it is not necessary to give permission to use the musical score data D to the developer of each music processing program Pb. Accordingly, there is the advantage that the burden on the developer of the music processing program Pb or the creator of the musical score data D is reduced.

Modified Example

Each of the embodiments exemplified above can be variously modified. Specific modified embodiments are illustrated below. Two or more embodiments arbitrarily selected from the following examples can be appropriately combined as long as they are not mutually contradictory.

Figure 7:
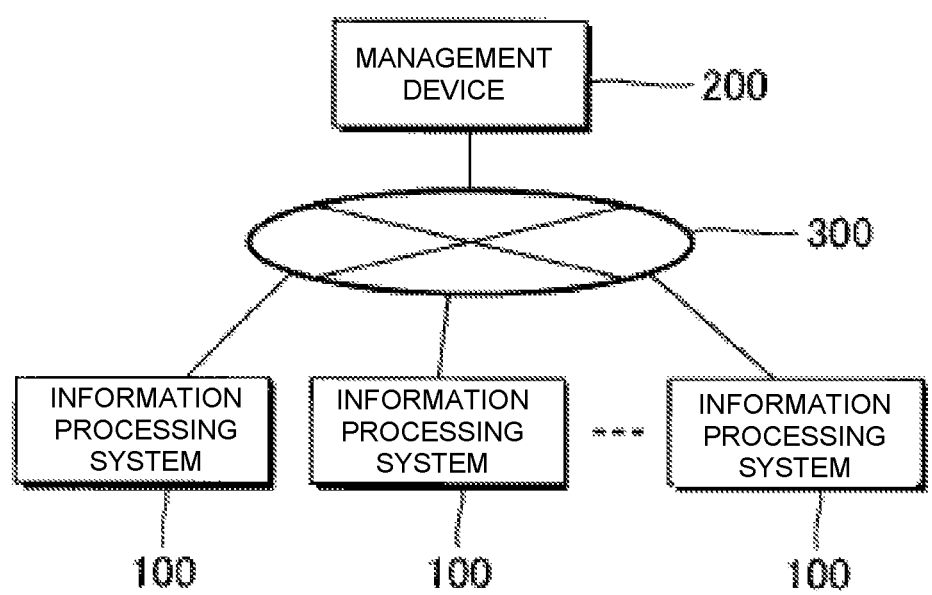
FIG. 7 is a block diagram of a modified example.

(1) As shown in FIG. 7, a configuration in which a plurality of information processing systems 100 communicate with a management device 200 via a communication network 300, such as the Internet, is also suitable. For example, the musical score processor 20 in each of the plurality of information processing systems 100 transmits, from the communication device 13 to the management device 200, the musical score data D to which is added the music information exemplified in the second embodiment. The management device 200 is a server device that can communicate with each information processing system 100, and aggregates the musical score data D transmitted from the plurality of information processing systems 100. The management device 200 identifies a tendency with which music information is added (what type of music information tends to be added to which position in the musical piece) by means of aggregating a plurality of pieces of the musical score data D. Moreover, the management device 200 introduces users of the plurality of information processing systems 100 who have transmitted musical score data D to which music information has been added with the same tendency to each other. A configuration for introducing users, who have similar attribute information, such as age, place of residence, age range, etc., to each other, or a configuration for introducing users, who have transmitted the musical score data D of a common musical piece, to each other can be employed as well.

Figure 8:
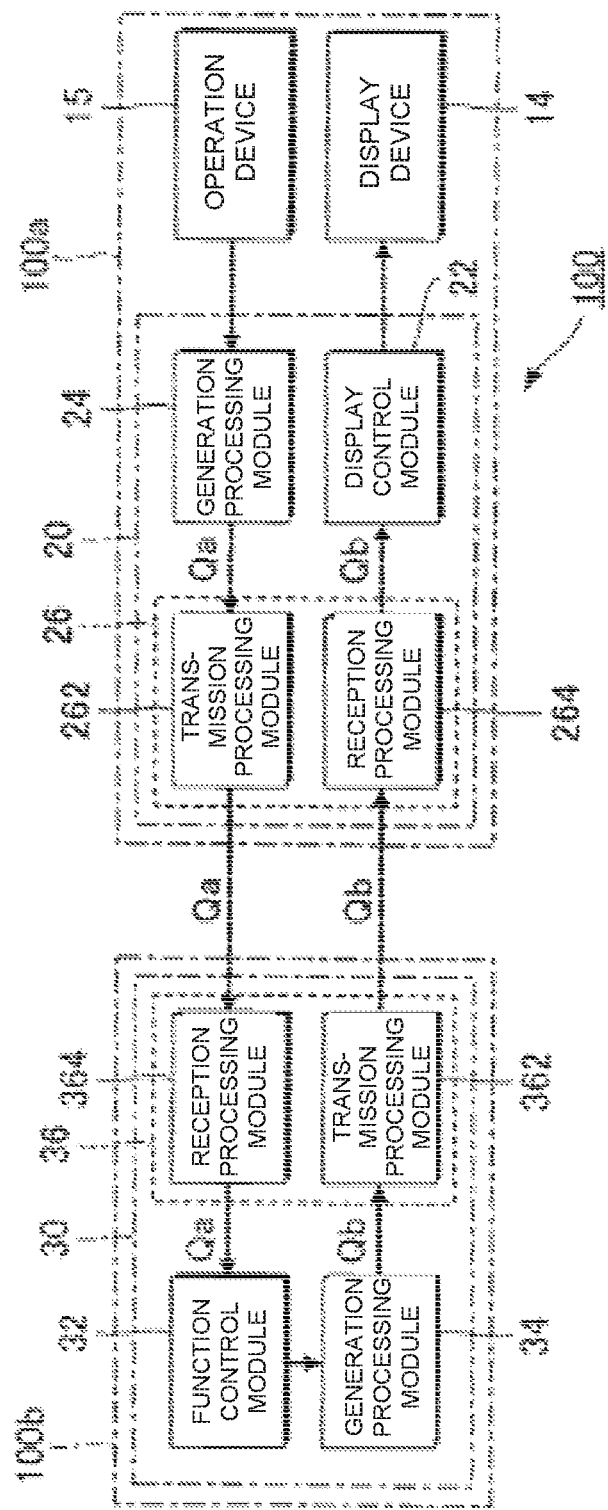
FIG. 8 is a block diagram focusing on functions of the information processing system according to the modified example.

(2) In each of the embodiments described above, an example was presented in which the musical score processor 20 and the music processor 30 are realized using one information processing system 100, but the musical score processor 20 and the music processor 30 can be realized with separate devices. For example, the information processing system 100 illustrated in FIG. 8 is configured to include a first system 100a and a second system 100b, which are separately configured. The musical score processor 20 is realized by means of the execution of the musical score processing program Pa by the control device (not shown) of the first system 100a, and the music processor 30 is realized by means of the execution of the music processing program Pb by the control device (not shown) of the second system 100b. The operation in which the musical score processor 20 and the music processor 30 mutually send and receive the control data Qa or the control data Qb by means of inter-application communication is the same as in the embodiments described above.

(3) In the first embodiment, the beat point notification process is exemplified as music processing, and in the second embodiment, the musical piece performance process is exemplified as music processing, but the content of the music processing realized by the music processing program Pb is not limited to the examples described above. For instance, another suitable example of music processing is a process for estimating the position that the user is currently playing (performance position) in the musical piece to be processed. The display control module 22 displays an image indicating the performance position in the musical score image Ga estimated by the music processor 30 and superimposed on the musical score image Ga on the display device 14.

(4) In the second embodiment, a configuration in which the musical score data D, to which is added the music information, are stored in the storage device 12 was exemplified, but an image G including the musical score image Ga indicated by the musical score data D and the function image Gb representing the music information can be printed using a printing device.

(5) For example, the following configurations can be understood from the embodiments exemplified above.

A musical score processing method according to a preferred aspect (Aspect 1) comprises execution of a reception process and a display control process by means of a musical score processing program; receiving control data, which are related to the display of a musical piece from a music processor that executes a process related to the musical piece and that is realized by a music processing program that is separate from the musical score processing program, by means of inter-application communication in the reception process; and displaying a musical score of the musical piece on a display device and controlling the display in accordance with the control data received in the reception process, in the display control process. By means of the aspect described above, a common musical score processing program can be used for displaying a musical score with respect to a plurality of types of music processing that are realized by different music processing programs. In other words, musical scores can be shared for a plurality of types of music processing. Accordingly, processing related to a musical piece can be conveniently used. Moreover, compared to a case in which a separate musical score is prepared for each of a plurality of programs that correspond to different music processing, there is the advantage that the storage capacity required for storing musical scores is reduced.

In a preferred example (Aspect 2) of Aspect 1, the musical score processing program executes a transmission process, and, in the transmission process, control data corresponding to a user's operation is transmitted to the music processor by means of inter-application communication. By means of the aspect described above, a shared musical score processing program can also be used for processes related to user operation. Thus, there is the remarkable effect that functions related to the musical piece can be conveniently used.

In a preferred example (Aspect 3) of Aspect 2, in the transmission process, control data indicating performance speed specified by the user are transmitted to the music processor by means of inter-application communication; the music processor executes a beat point notification process in which a sound output device is caused to output a beat sound in the period corresponding to the performance speed indicated by the control data transmitted in the transmission process, and in which are transmitted control data for providing instruction for updating a function image that indicates the beats of the musical piece; and, in the display control process, the function image is displayed on the display device along with the musical score, and the function image is updated in accordance with the control data received in the reception process. By means of the aspect described above, beat sounds are output in the period corresponding to the performance speed specified by the user, and the function image showing the beats of the musical piece is updated in accordance with the control data received from the music processor by means of inter-application communication. The user can thus perceive the beats of the musical piece audibly and visually.

In a preferred example (Aspect 4) of Aspect 2, in the transmission process, control data indicating a starting of the performance of the musical piece are transmitted to the music processor by means of inter-application communication; the music processor executes a musical piece performance process in which performance sounds of the musical piece are reproduced in accordance with the control data transmitted in the transmission process, and in which are transmitted control data for providing instruction for updating a function image representing music information of the musical piece; and, in the display control process, the function image is displayed on the display device along with the musical score, and the display mode of the function image is changed in accordance with the control data received in the reception process. By means of the aspect described above, the performance sounds of the musical piece are reproduced in accordance with user instruction to start the performance, and the function image showing the music information is updated in accordance with the control data received from the music processor by means of inter-application communication. The user can thus check the music information of the musical piece in parallel with listening to the performance sounds of the musical piece.

In a preferred example (Aspect 5) of any one of Aspects 1 to 4, in the reception process, control data related to the display of the musical piece are received from each of a plurality of music processors realized by different music processing programs by means of inter-application communication. By means of the aspect described above, there is the advantage that the musical score processing program can be shared for a plurality of music processing programs.

A musical score processing system according to a preferred aspect (Aspect 6) comprises a display control module and a reception processing module realized by a musical score processing program, wherein the reception processing module receives, by means of inter-application communication, control data related to the display of a musical piece from a music processor that executes a process related to the musical piece and that is realized by a music processing program that is separate from the musical score processing program, and the display control module displays a musical score of the musical piece on a display device and controls the display in accordance with the control data received by the reception processing module. By means of the aspect described above, a common musical score processing program can be used for displaying a musical score with respect to a plurality of types of music processing that are realized by different music processing programs. In other words, musical scores can be shared for a plurality of types of music processing. Accordingly, processing related to a musical piece can be conveniently used.

A musical score processing system according to a preferred example (Aspect 7) of Aspect 6 comprises a transmission processing module that is realized by the musical score processing program and that transmits control data corresponding to a user operation to the music processor by means of inter-application communication. By means of the aspect described above, a shared musical score processing program can also be used for processes related to user operation. Accordingly, there is the remarkable effect that functions related to the musical piece can be conveniently used.

In a preferred example (Aspect 8) of Aspect 6 or 7, the reception processing module can receive control data that relate to the display of the musical piece from each of a plurality of music processors realized by different music processing programs by means of inter-application communication. By means of the aspect described above, there is the advantage that the musical score processing program can be shared for a plurality of music processing programs.

An information processing system according to a preferred aspect (Aspect 9) comprises a display control module and a reception processing module realized by a musical score processing program; and a music processor realized by a music processing program that is separate from the musical score processing program, wherein the music processor executes a process related to a musical piece and generation of control data corresponding to the process, the reception processing module receives the control data from the music processor by means of inter-application communication, and the display control module displays a musical score of the musical piece on a display device and controls the display in accordance with the control data received by the reception processing module.

A musical score processing program according to a preferred aspect (Aspect 10) is a musical score display control program that causes a computer to function as a reception processing module and a display control module, the reception processing module receives, by means of inter-application communication, control data related to a display of a musical piece from a music processor that executes a process related to the musical piece, realized by a music processing program that is separate from the musical score processing program, and the display control module displays a musical score of the musical piece on a display device and controls the display in accordance with the control data received by the reception processing module.

The musical score processing program exemplified above can be stored on a computer-readable storage medium and installed on a computer. The storage medium is, for example, a non-transitory storage medium, a good example of which is an optical storage medium (optical disc) such as a CD-ROM, but can include storage mediums of any known format, such as a semiconductor storage medium or a magnetic storage medium. Non-transitory storage media include any storage medium that excludes transitory propagating signals, and does not exclude volatile storage media. Furthermore, the program can be delivered to a computer in the form of distribution via a communication network.

What is claims:

1. A musical score processing method realized by a computer, the musical score processing method comprising:

displaying a musical piece in accordance with a control data that has been received based on a musical score processing program;

transmitting the control data corresponding to a user operation to a music processor using inter-application communication based on the musical score processing program, the music processor executing a process related to the musical piece and being realized by a music processing program, the music processing program being separate from the musical score processing program;

receiving the control data related to displaying of the musical piece from the music processor; and executing a display control process by displaying a musical score of the musical piece on a display device based on the control data.

2. The musical score processing method according to claim 1, wherein in the transmitting, a control data indicating performance speed specified by a user as the control data corresponding to the user operation is transmitted to the music processor, using the inter-application communication, the musical score processing method further comprises executing, at the music processor, a beat notification process in which a sound output device is caused to output a beat sound in a period corresponding to the performance speed indicated by the control data transmitted in the transmitting, and in which a control data for providing instruction for updating a function image that indicates beats of the musical piece is transmitted as the control data related to displaying of the musical piece, and in the display control process, the function image is displayed on the display device along with the musical score, and the function image is updated in accordance with the control data received in the receiving.

3. The musical score processing method according to claim 1, wherein in the transmitting, a control data indicating a start of performance of the musical piece as the control data corresponding to the user operation is transmitted to the music processor, using the inter-application communication, the musical score processing method further comprises executing, at the music processor, a musical piece performance process in which performance sounds of the musical piece are reproduced in accordance with the control data transmitted in the transmitting, and in which a control data for providing instruction for updating a function image representing music information of the musical piece is transmitted as the control data related to displaying of the musical piece, and in the display control process, the function image is displayed on the display device along with the musical score, and a display mode of the function image is changed in accordance with the control data received in the receiving.

4. The musical score processing method according to claim 1, wherein in the receiving, the control data related to the displaying of the musical piece is received from each of a plurality of music processors that are realized by different music processing programs and include the music processor, using the inter-application communication.

5. A musical score processing system, comprising:

an electronic controller including at least one processor, the electronic controller being configured to execute a plurality of modules including a display control module that is realized by a musical score processing program and that displays a musical piece in accordance with a control data that has been received based on the musical score processing program, a transmission processing module that is realized by the musical score processing program and that transmits the control data corresponding to a user operation to a music processor, using inter-application communication based on the musical score processing program, the music processor executing a process related to the musical piece and being realized by a music processing program, the music processing program being separate from the musical score processing program, and a reception processing module that is realized by the musical score processing program and that receives the control data related to displaying of the musical piece from the music processor, the display control module further executing a display control process by displaying a musical score of the musical piece on a display device based on the control data received by the reception processing module.

6. The musical score processing system according to claim 5, wherein the reception processing module receives the control data related to the displaying of the musical piece from each of a plurality of music processors that are realized by different music processing programs and that and include the music processor, using the inter-application communication.

* * * * *